United States Patent [19]

Katsaros

[11] Patent Number: 5,114,658
[45] Date of Patent: May 19, 1992

[54] ONE STEP PREPARATION AND FABRICATION OF PARTIALLY GRAFTED FLEXIBLE THERMOPLASTIC COMPOSITIONS

[75] Inventor: James D. Katsaros, Beaumont, Tex.

[73] Assignee: E. I. Du Pont de Nemours and Company, Wilmington, Del.

[21] Appl. No.: 613,598

[22] Filed: Nov. 15, 1990

[51] Int. Cl.$^5$ .............. B29C 45/50; B29C 45/60; B29C 49/04; B29C 49/06

[52] U.S. Cl. .................. 264/537; 264/540; 264/328.17; 264/328.19; 264/331.15; 264/331.18; 264/349; 425/208

[58] Field of Search ......... 264/537, 328.17, 328.19, 264/331.15, 331.18, 331.19, 349, 540; 425/206, 207, 208; 525/286, 208, 193, 185, 189, 33, 201, 203, 209, 217, 220, 221

[56] References Cited

U.S. PATENT DOCUMENTS

| | | | |
|---|---|---|---|
| 4,410,482 | 10/1983 | Subramanian | 264/349 |
| 4,770,837 | 9/1988 | Lu et al. | 264/514 |
| 4,784,819 | 11/1988 | Spurr | 264/328.19 |
| 4,871,810 | 10/1989 | Saltman | 525/133 |
| 4,908,169 | 3/1990 | Galic et al. | 425/208 |
| 5,013,233 | 5/1991 | Semmekrot | 264/349 |

FOREIGN PATENT DOCUMENTS 0340873 11/1989 European Pat. Off. .
43-24493 10/1968 Japan .................... 425/208
8803543 5/1988 PCT Int'l Appl. .

OTHER PUBLICATIONS

C. P. J. M. Verbraak & H. E. H. Meijer, "Screen Design in Injection Molding", vol. 29, No. 7, pp. 479–487.
A. Whelan, Injection Molding Machines, 1984.
Du Pont Information Bulletin, A-88012, 1973.
"Twente Mixing Ring", published by University of Twente, No. 1989.

*Primary Examiner*—Jan H. Silbaugh
*Assistant Examiner*—Catherine Timm

[57] ABSTRACT

Melt fabrication, without precompounding, of a composition comprising a thermoplastic resin, an acid containing ethylene copolymer and a polymeric grafting agent, is provided by (1) bringing the molten components of the composition together for the first time, (2) intermittently shearing the components, preferably in an injection molding machine or a blow molding machine having a screw with a shearing section, and (3) intermittently fabricating in one-step the sheared molten composition into articles of pre-determined shape. The thermoplastic resin is less than 50 volume percent and is at least one continuous phase in the composition. The process is improved by increasing back pressure on the screw used in the injection molding machine, to extend the screw rotation and shear time.

13 Claims, 3 Drawing Sheets

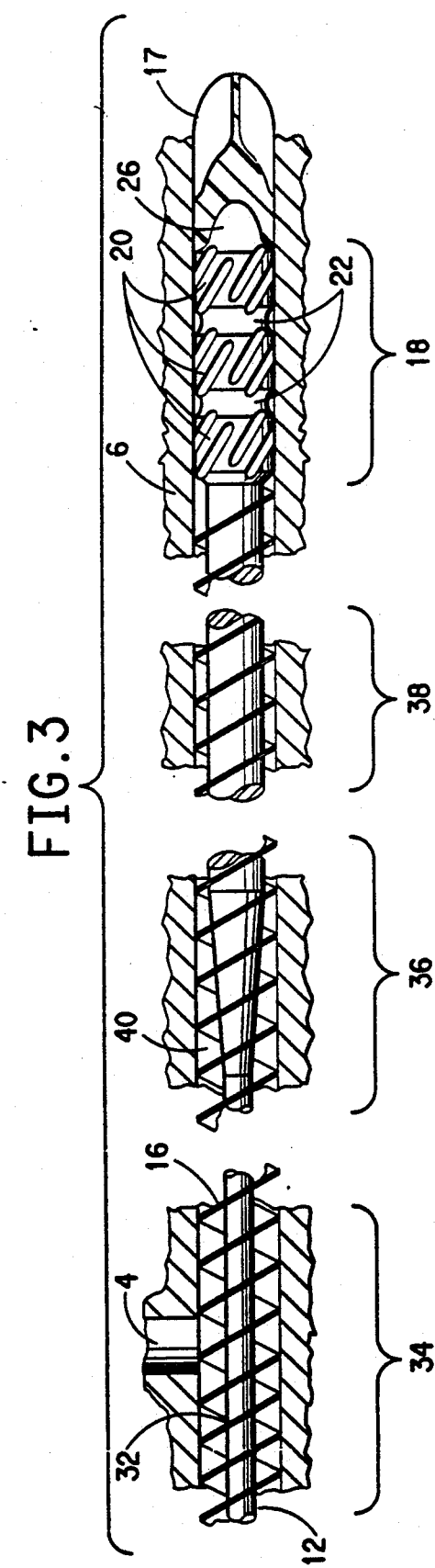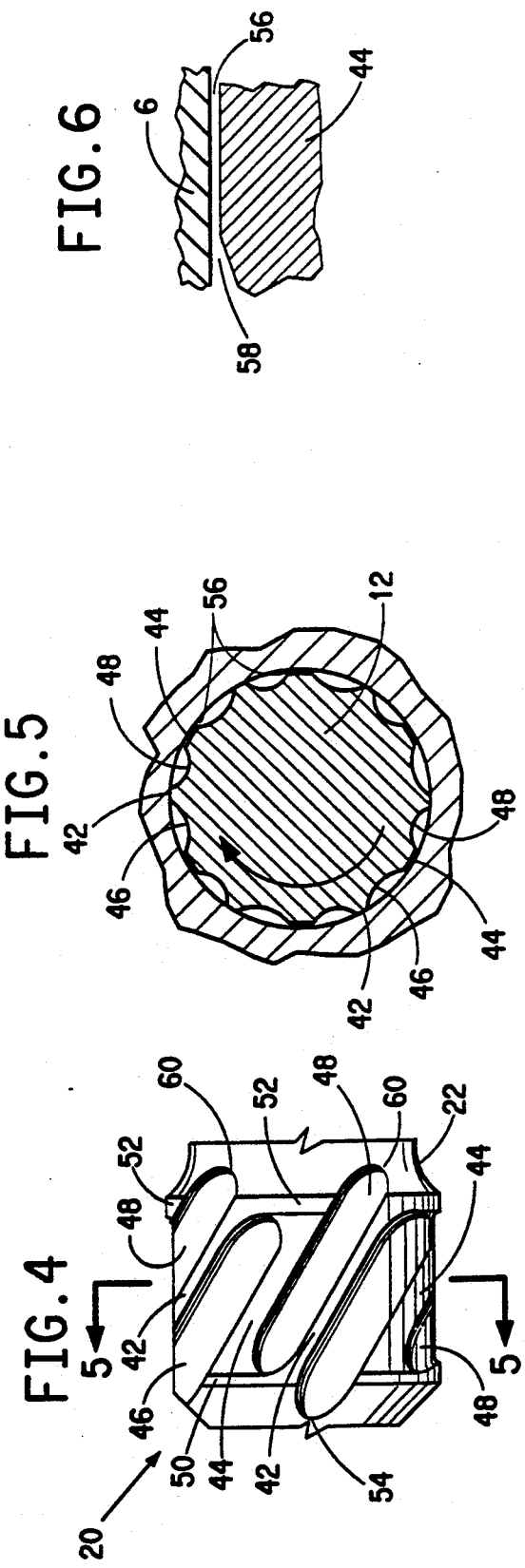

ONE STEP PREPARATION AND FABRICATION OF PARTIALLY GRAFTED FLEXIBLE THERMOPLASTIC COMPOSITIONS

FIELD OF THE INVENTION

This invention relates to a one step preparation and fabrication of partially grafted flexible thermoplastic resin compositions which contain three polymeric components, thus, eliminating the precompounding step in the preparation of these compositions.

BACKGROUND OF THE INVENTION

Thermoplastic resin blends are increasingly common in the plastics industry today. These thermoplastic resin compositions may be produced from two or more thermoplastic resins or from thermoplastic resin(s) and various other components, including crosslinked elastomers, fillers, plasticizers, and the like. While one or more of the components above may not themselves be processible using conventional thermoplastic molding equipment, e.g. crosslinked elastomers or mineral fillers, the resultant blends are designed to be processed using one of several types of thermoplastic forming equipment, for example injection molding machines and blow molding machines.

One of the earliest types of blends developed was a filled blend, i.e. a thermoplastic resin which is filled with an inert filler to produce a reinforced thermoplastic blend. The filler may be particulate, fibrous or of some other form. Generally, a filled blend contains a relatively large amount of the filler. Preparation of filled blends involves uniformly distributing the filler particles throughout the thermoplastic, and maintaining the thermoplastic resin as a continuous phase (matrix), which allows melt fabrication. Melt fabrication may be prevented if high levels of filler or interaction between filler particles reduce the thermoplastic nature of the melt.

Another common type of blend is a toughened thermoplastic. Ideally, a rubber-like material is distributed in small particles throughout a matrix thermoplastic in the blend, although often complex phase structures can exist. The particle size of the rubber-like material or toughener is frequently important in achieving maximum toughness. In contrast to filled thermoplastic blends where the already formed filler particles are merely distributed throughout the matrix, the production of toughened thermoplastics blends will generally involve breakdown of large particles of the rubber-like toughener into smaller ones, in addition to distribution of the toughener particles throughout the matrix resin. Thus, the toughener is dispersed as well as distributed. In addition, the dispersing of the toughener may involve a form of mixing which involves high shear. In toughened thermoplastic blends, the thermoplastic resin is usually more than 70 percent of the blend.

Processing and fabrication of such thermoplastic resin blends has heretofore been conducted in two discrete steps: first, melt blending of the components of the blend (e.g. in an extruder) and formation of the blend into cooled resin pellets, and second, remelting the resin pellets, shaping the blend in a thermoplastic molding device, (e.g. in an injection molding or blow molding machine), and finally re-cooling the shaped article made from the resin blend.

Recently a new type of thermoplastic blend has been developed which will hereinafter be referred to as a "partially grafted flexible thermoplastic composition". These compositions are disclosed in U.S. Pat. No. 4,871,810, granted Oct. 3, 1989 to Saltman (hereinafter referred to as Saltman I), and in PCT Patent Publication WO 88/03543, published May 19, 1988 (hereinafter referred to as Saltman II). Both references are hereby incorporated by reference. These compositions contain at least three polymeric components, namely, a thermoplastic resin, component (a), which may be non-reactive (Saltman I) or reactive (Saltman II); an ethylene acid copolymer or its derived ionomer, component (b); and a polymeric grafting agent, component (c).

Saltman I and II describe the melt processing and fabrication of these compositions in two discrete steps as generally described above, except that Saltman emphasizes the importance in the first step (forming the melt blended pellets) of conditions that will enable chemical reaction between at least components (b) and (c). In the Examples in Saltman I and II, compositions are pre-blended into pellets by dry mixing the ingredients in a "salt and pepper" blend, followed by extrusion in a 28 mm twin screw extruder using a high shear screw. Saltman I, also uses a System 40 Haake rheocord, using a Banbury attachment for pre-blending some of the compositions. Other conventional plasticating devices such as a Brabender or Banbury mill are disclosed for pre-blending to yield molding pellets. The molding pellets are formed into shaped articles in a discrete fabrication step, which starts with feeding of the molding pellets to an injection molding machine.

Thus in both Saltman I and Saltman II, the shaped articles formed from the partially grafted flexible thermoplastic resin compositions were produced in two steps. Specifically, the thermoplastic resins were first compounded to form molding pellets (hereinafter referred to as pre-compounding), followed by a second step of injection molding to form the shaped articles. The chemical reaction is accomplished in the pre-compounding step; the fabrication is accomplished in the injection molding step.

Both component (b) and component (c) are thermoplastic and melt processable by themselves. In the pre-compounding step disclosed in Saltman I and II, components (b) and (c), however, react with each other during the shearing of the molten composition which results in a single partially grafted phase. Component (c) contains a reactive group, typically a glycidyl group which reacts with the acid group in component (b); and (i) reacts with the thermoplastic resin, component (a), if the thermoplastic has reactive groups (Saltman II) or (ii) is compatible with component (a) (Saltman I).

The thermoplastic resin, component (a), is present in Saltman I and Saltman II compositions in no greater than 50 volume percent of the total of components (a) plus (b) plus (c), yet component (a) becomes at least one continuous phase. It is believed that this phase morphology results from the reaction at least between components (b) and (c) during the pre-compounding step and enables the composition to be flexible, thermoplastically processible and to achieve good mechanical properties at high temperatures.

Component (c), the polymeric grafting agent, achieves a highly controllable and reproducible level of grafting in the compositions of Saltman I and II. The polymeric grafting agent has a carefully defined level of reactive groups in relation to the level of acid groups in the ethylene acid copolymer, component (b). If the reactive group relationship is not satisfied, the desired proper morphology and therefore the desired properties are not achieved. If, too little grafting is achieved, the thermoplastic resin does not become a continuous phase as required; or if too much grafting occurs, the blend approaches intractibility.

Thermoplastic resin blends can comprise a wide range of types, with a wide range of components, proportions and properties. Accordingly, it is not surprising that blending means have to be found to best produce each particular type. For example, incorporating a colorant may involve only distributive mixing, where color particles are uniformly distributed in the matrix resin; and fiber filled resins may also require distributive mixing, but there may be critical conditions required not to break the fibers, so that high shear conditions may be unacceptable. However, incorporating a toughener may involve both distributive and dispersive mixing. The latter is generally a higher shear process. In the case of the partially grafted flexible thermoplastic resin compositions of Saltman I and II, at least components (b) and (c) are required to react with each other chemically as well as be intimately blended and further achieve a proper morphology, namely, wherein component (a), which is not the major volume component, is at least one continuous phase of the melt processed composition. Proper mixing to accomplish all of these objectives has heretofore only been achieved using a discrete pre-compounding step.

Conventional injection molding does not lend itself to high shear mixing sufficient to achieve the sought after chemical reaction between components (b) and (c) and the required phase morphology.

Typical injection molding machines use a single screw which both reciprocates and rotates within a barrel in the following sequence of steps which constitute the molding cycle:

(i) screw forward or injection time
(ii) hold time
(iii) mold open time or boost.

During the screw forward time, the screw reciprocates (rams) towards the injection port (nozzle) of the machine to force molten resin into the mold. Also included in this step is the time the screw is held in the forward position to keep the mold full of molten resin as the molded article starts to solidify.

During the hold time, the screw rotates and retracts under the pressure of the molten resin being forced by the screw into the forward end of the barrel, i.e., adjacent to the injection port of the barrel. During this rotation, the resin feed to the injection molding machine becomes melted and transported into this injection position. Normally, when the screw retracts to a certain point, this means the forward end of the barrel is filled with the desired amount of molten resin and the screw stops rotating. Additional hold time is typically taken up with the screw positioned stationary in the retracted position until the molded article has cooled sufficiently.

During the mold opening step of the cycle, the screw remains stationary and retracted while the mold opens and the molded article is removed from the mold.

A typical molding cycle might take 55 seconds, consisting of 25 seconds screw forward time, 25 seconds hold time, and 5 seconds mold open time. Typically the screw rotates for only a portion of the 25 second hold time.

Because the screws typically used in injection molding machines are desired to merely transport and melt the thermoplastic material, and because the molding cycle typically includes only a small proportion of time when the screw is rotating, pre-compounding has served as the standard for polymer resin preparation, particularly where reaction of components is required and a resin component which is not a major volume component is forced into becoming a continuous phase. Heretofore, two step melt processing has been the only known method for producing the partially grafted thermoplastic resin compositions of Saltman I and II.

SUMMARY OF THE INVENTION

The present invention provides a one-step process for the preparation and fabrication of Saltman I and II partially grafted flexible thermoplastic resin compositions prepared from three polymeric components. Specifically, the pre-compounding step is eliminated, while the three components are still blended sufficiently to get the required chemical reaction between components and required phase morphology.

In a process for fabricating shaped articles of a composition of (a) 25–50 volume percent thermoplastic resin, (b) 10–74 volume percent acid containing ethylene copolymer or ionomer (hereinafter acid containing ethylene copolymer) and (c) 1–50 volume percent polymeric grafting agent, containing 0.5–15.0 weight percent of monomers containing reactive groups based on component (c) only and wherein the quantity of reactive groups provided to the molten composition by the polymeric grafting agent expressed as millimoles of reactive groups per 100 grams of component (b) plus component (c) is between 1 and 35 when component (a) is non-reactive, and from 0.5 to 16 when component (a) is reactive, and further wherein the above volume percentages for the components (a), (b) and (c) are based on the total of component (a), component (b) and component (c) only and are calculated from the densities of the individual components prior to mixing, the process including bringing molten components (a), (b) and (c) together under sufficient shear (which is dependent upon shear rate and shear time) to cause at least the components (b) and (c) to react with each other to in turn cause the component (a) to form a continuous phase, the improvement comprising the steps of (1) bringing the molten components together essentially for the first time;
(2) subjecting the molten components to shear on an intermittent basis; and
(3) intermittently fabricating in one-step the sheared molten composition to articles of pre-determined shape.

By "shaped articles" is meant any of the articles as would conventionally be made by injection molding or blow molding; and this is not meant to include rod (whole or cut) as would normally be made by extrusion. By "one-step fabricating" is meant forming the molten thermoplastic blend into a shaped article without typical pre-compounding, which would normally include forming the blend into molding pellets and cooling the pellets, prior to re-melting the pellets and shaping the molten pellets.

This process is adaptable to being carried out in the typical single-stage injection molding machine which uses a single screw rotating and reciprocating within a barrel to melt, shear and inject molten resin into the mold of the machine. In the process conducted in this type of machine, the intermittent shearing and intermittent one-step fabricating are alternating, i.e., while the molten resin is being forced into the pre-determined shape in the mold, the screw is not rotating and therefore the melt within the barrel is not being subjected to shear. The shear portion of the injection molding cycle produces the required chemical reaction and phase morphology in the fabricated article.

The process of the present invention is also applicable to injection blow molding wherein the same alternating relationship between shearing and forcing into a pre-determined shape is observed. In a machine carrying out this particular process, the pre-determined shape is subsequently also subjected to blow molding to produce the desired finished article.

The process of the present invention is also applicable to injection molding in a two stage machine wherein a single screw is used to melt resin and force it through a check valve into an injection cylinder. A ram then forces this molten resin into the mold. In one type of two-stage injection molding machine, the screw does not reciprocate, but it does stop rotation during the times the injection cylinder is filled with molten resin, and the ram injects the molten resin into the mold and the ram remains in the forward position to maintain pressure on the resin in the mold until it solidifies.

In another type of two-stage injection molding machine, the screw reciprocates similarly to the operation of a single-stage injection molding machine. In this two-stage machine, however, the forward thrust of the screw injects molten resin into the injection cylinder rather than the mold, and the ram then forces the molten resin into the mold. The screw can rotate to melt resin, until the screw reciprocates to its back position, which gives a faster cycle time as compared to a single-stage machine. In this type of two-stage machine, the shearing and direct fabrication are simultaneous.

The process of the present invention is also applicable to extrusion blow molding, wherein the direct fabrication of the sheared melt into the pre-determined shape is done by extrusion of a tube. A mold closes around the tube. The mold is then transferred to a blow molding station for blow molding into the article desired. During the mold closure and transfer, the extruder screw is stopped, during which time the melt within the extruder is not being subjected to shear. Thus in the application of the present invention to extrusion blow molding, the intermittent shearing and one-step fabricating are simultaneous.

Single-stage injection molding, injection blow molding and extrusion blow molding are preferred machines; and single-stage injection molding is most preferred.

In all cases, the process of the present invention produces either a finished article having generally the final shape desired or an intermediate article which is blow molded to the finished article.

The process of the present invention is accomplished by fitting the screw used in the injection molding, injection blow molding, or extrusion blow molding machine with an appropriate shearing section and then operating the machine under conditions of screw speed, back pressure and screw rotation time which produce the required reaction between components and results in at least one continuous phase of the thermoplastic resin, component (a).

DESCRIPTION OF DRAWINGS

FIG. 1 is a schematic side elevation in cross-section of an injection molding machine useful for carrying out a process of the present invention, with the embodiment of the screw shown in the retracted position.

FIG. 2 shows the injection molding machine of FIG. 1 with the screw in the rammed or forward position.

FIG. 3 is a side view, in enlargement and indeterminate length, of one embodiment of screw shown in FIGS. 1 and 2 useful for carrying out the process of the present invention.

FIG. 4 shows in enlargement as compared to FIG. 3 one of the plurality of shearing section making up the shear section of the screw of FIG. 3.

FIG. 5 is a cross section taken along line 5—5 of FIG. 4.

FIG. 6 shows in enlargement one embodiment of barrier flight for use in the shearing section of the screw.

DESCRIPTION OF PREFERRED EMBODIMENTS

Figure 8:
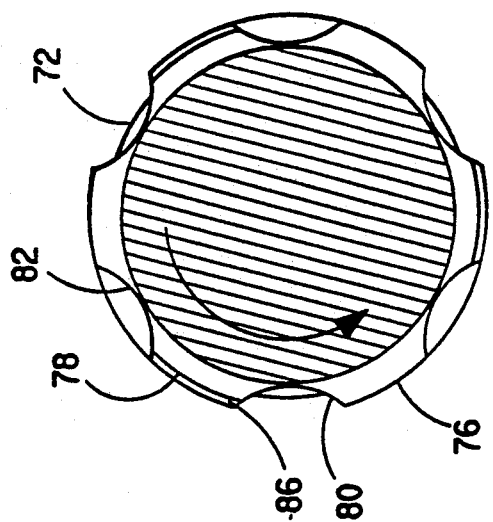
FIG. 8. shows a cross section of the shearing section of FIG. 7 taken along line 8—8 of FIG. 7.

High shear mixing is required by the present invention to ensure proper mixing of and intimate contact between the components such as would be necessary to carry out the chemical reaction. In addition, sufficient mixing and high shear is essential to achieve the morphology which is necessary in the compositions of the present invention. The morphology required for the compositions of the present invention is that at least one of the continuous phases must be the thermoplastic resin, component (a).

Preferred thermoplastic resins, component (a), used in the process of the present invention are as follows. Polyamide resins suitable for use in the present invention include those described by U.S. Pat. No. 4,174,358 of Epstein and U.S. Pat. No. 4,338,413 and patents incorporated therein including U.S. Pat. Nos. 2,071,250, 2,071,251, 2,130,523, 2,130,948, 2,241,322, 2,312,966, 2,512,606 and 3,393,210.

Preferred polyamides include nylon 66, nylon 6, nylon 612, nylon 11, nylon 12, nylon 1212, amorphous nylons, nylon 666 and polyether block amides.

Most preferred polyamides include nylon 66, nylon 612, nylon 1212 and nylon 6.

Polyester resins suitable for use in the current invention include those described in U.S. Pat. No. 4,172,859 of Epstein and PCT publication No. WO 85/03718. In addition, copolyetherester polymers such as those described in U.S. Pat. No. 4,221,703 of Hoeschele, and poly(etherimide esters) such as described by U.S. Pat. No. 4,556,705 of McCready can be used. In addition, aromatic polyesters that are prepared from various ratios of iso-and terephthalic acids with bisphenol A can be used.

Polycarbonate resins suitable for use in the current invention are described in U.S. Pat. No. 4,172,859 of Epstein and U.S. Pat. No. 2,999,835 of Goldberg.

In addition, those thermoplastic resins, component (a) which are also suitable for use in the present invention include those described by U.S. Pat. No. 4,871,810 of Saltman.

Component (a), the thermoplastic resin is preferably present in an amount of 27–48 volume percent, and most preferably in an amount of 28–46 volume percent.

Suitable acid containing ethylene copolymers component (b), include ethylene/acrylic acid, ethylene/methacrylic acid, ethylene/acrylic acid/n-butyl acrylate, ethylene/methacrylic acid/n-butyl acrylate, ethylene/methyacrylic acid/iso-butyl acrylate, ethylene/acrylic acid/iso-butyl acrylate, ethylene/methacrylic acid/n-butyl methacrylate, ethylene/acrylic acid/methyl methacrylate, ethylene/acrylic acid/ethyl vinyl ether, ethylene/methacrylic acid/butyl vinyl ether ethylene/acrylic acid/methyl acrylate, ethylene/methacrylic acid/methyl acrylate, ethylene/methacrylic acid/methyl methacrylate, ethylene/acrylic acid/n-butyl methacrylate, ethylene/methacrylic acid/ethyl vinyl ether and ethylene/acrylic acid/butyl vinyl ether.

In addition, those acid-containing ethylene copolymers which are also suitable for use in the present invention include those described by U.S. Pat. No. 4,817,810.

The acid groups in the acid-containing ethylene copolymers may be neutralized from 0-100 percent by a metal ion.

Component (b), the acid-containing ethylene copolymers, are preferably present in an amount of 20-69 volume percent, and most preferably in an amount of 30-65 volume percent.

The polymeric grafting agent, component (c), include ethylene copolymers copolymerized with one or more reactive moieties selected from unsaturated epoxides of 4-11 carbon atoms, such as glycidyl acrylate, glycidyl methacrylate, allyl glycidyl ether, vinyl glycidyl ether, and glycidyl itaconate, unsaturated isocyanates of 2-11 carbon atoms, such as vinyl isocyanate and isocyanatoethyl methylacrylate, aziridine, silanes such as alkoxy or alkyl silanes, alkylating agents such as alkyl halides or alpha-halo ketones or aldehydes or oxazoline and may additionally contain an alkyl acrylate, alkyl methacrylate, carbon monoxide, sulfur dioxide and/or vinyl ether, where the alkyl radical is from 1-12 carbon atoms.

Component (c), the polymeric grafting agent, is preferably present in an amount of 4-35 volume percent, and most preferably in an amount of 7-25 volume percent.

In addition to component (a), component (b) and component (c), discussed above, the partially grafted flexible thermoplastic compositions of the present invention may include other ingredients as are used in the conventional compounding of thermoplastics and/or ethylene copolymers, provided that such additional ingredients are no more than 100 parts by weight per 100 parts of the total of component (a) plus component (b) plus component (c). Examples of such other ingredients include carbon black, glass fibers, graphite fibers, Kevlar® fibers, glass spheres, plasticizers, lubricants, silica, titanium dioxide, pigments, clay, mica and other mineral fillers, flame retardants, antioxidants, ultraviolet stabilizers, heat stabilizers, processing aids, adhesives and tackifiers. Fabrication of these partially grafted flexible thermoplastic resin compositions without precompounding allows for more flexibility of additional fillers for specialized compositions in unique applications.

The operation of the process of the present invention will be described with reference to the drawings.

Initially components (a), (b) and (c) are combined. This can be done by simultaneously feeding the components as individual streams or a dry mixed blend to the feed hopper 4 of an injection molding machine 2 (FIGS. 1 and 2). The resins present in the components are preconditioned, e.g, dried, as may be required, depending on the resins being used. For example, a typical drying condition is such that the dried resin has a moisture content of less than about 0.02 weight percent when the resin is polyethylene terephthalate and less than about 0.15 weight percent when the resin is polyamide.

The injection molding machine includes a barrel portion 6, defining a heated cylindrical chamber 8 and a hydraulic cylinder portion 10. A plasticating screw 12 is positioned axially within the chamber 8 and extends into the hydraulic cylinder portion 10 of the machine, where the screw terminates with a cylinder head 14.

The screw has a helical flight 16 for advancing the particle feed from hopper 4 along the length of chamber 8 towards the forward end of the barrel portion 6 which is equipped with an injection nozzle 17. During this advancement, the resin particles become mixed together, compacted, and melted from the heat supplied by the barrel portion and internally generated heat from the mixing and compaction. For amorphous resins, the melt condition means that the resin is heated above its softening point. For crystalline resin, the melt condition means that the resin is heated above its melt temperature. This is essentially the first time that the components are melt blended together in the proportions necessary to obtain the desired result.

The molten combination of resins is next received by the shearing section 18 of the screw which consists of three shearing sections 20 separated by intervening transverse mixing channels 22. Further details of the screw will be described later herein with reference to FIGS. 3 to 6.

The shearing section 18 which may be called the shearing head of the screw 12 forces the component (a) into at least one continuous phase by providing the high shear needed for sufficient chemical reaction to occur.

The forward position of the screw 12 is shown in FIG. 2. This position is representative of the forward time of the injection molding cycle, in which the screw 12 forces an amount of molten resin through the nozzle 17 into the mold 24 which is merely shown as a box because of the conventionality of this aspect. During this time, including the time the screw is maintained in the forward position to maintain pressure on the contents of the mold, the screw is not rotating, and accordingly, the resin melt is not being subjected to shear. The forward position of the screw 12 is obtained by applying hydraulic pressure by conventional means against the face 15 of the cylinder head 14 of the screw. The nose 26 of the screw generally conforms to the interior shape of the nozzle so as to minimize the amount of molten resin remaining in the forward portion of the cylindrical chamber 2. The nose 26 may also be equipped with a conventional check valve (not shown) to prevent molten resin from back flow within the cylindrical chamber when the screw rams forward and is held in the forward position.

Upon completion of the screw forward time, the screw commences rotation, for example via gear 28 mounted on the screw 12 and engaged with conventional gear driving means (not shown). During this rotation, the particle feed is subjected to additional melting as it advances along the screw 12 and to shear as the resultant melt traverses the shear section 18 of the screw.

During the rotation of the screw, the pressure against the cylinder head 14 of the screw is reduced and the screw 12 retracts within the chamber 8 as the molten, sheared resin fills up the forward end of the chamber. FIG. 1 shows the screw 12 in the retracted position and the presence of molten resin 30 in the forward end of the chamber. When the screw reaches this position, the amount of the molten resin 30 present in the forward end of the chamber is the amount necessary to fill the pre-determined shape provided by the mold. The screw rotates during the retraction and when it reaches the retracted position, the rotation of the screw is stopped. This retraction time and the time spent in the retracted position to permit the molded article to cool to solidification is the hold time of the injection molding cycle. The screw rotates only during its retraction during the hold time. The screw is also standing still while the mold is opened and the molded article removed therefrom.

In accordance with the present invention, the retraction of the screw may be retarded so as to extend the rotation time of the screw to provide the shear needed to cause chemical reaction between components and assure the required phase morphology. This is accomplished by applying pressure to the face 15 of cylinder head 14 of the screw during the hold time of the molding cycle. The effect of this retardation is to extend the shearing time for the molten resin. This is applicable to single-stage injection molding, two-stage injection molding wherein the screw retracts, and injection blow molding. For typical injection molding operations, the back pressure on the screw is about 0.3 MPa (50 psi). In operation of the process of the present invention, the back pressure will generally be at least 1.5 MPa.

For two-stage injection molding wherein the screw does not retract and extrusion blow molding, the high degree of shear necessary to force the thermoplastic resin into at least one continuous phase can be achieved by proper selection of the screw speed (rpm) and spill clearance which provides this shear. The check valve present in the two-stage injection molding machine between the screw barrel and the injection chamber shears the molten resin as it is forced by the screw into the injection cylinder, to supplement the shear provided by the shearing section of the screw.

Extended shearing time and increased shear intensity provided by the shearing section of the screw both contribute to the success of the present one-step process for fabricating shaped articles from the partially grafted flexible thermoplastic compostions of Saltman I and II. FIGS. 3 to 6 show details of one embodiment of screw design for accomplishing the necessary shear.

Screw 12 has a helical bearing flight 16 and a root 32 which forms in sequence extending in the direction of resin movement along the chamber 8, a feed section 34, a transition section 36, and a metering section 38 which are designed to deliver a steady flow of molten resin to the shearing section 18 of the screw.

The feed, transition, and metering sections are conventional screw features and can have many different designs to accomplish this delivery. In the embodiment shown in FIG. 3, the root 32 has a constant diameter over several turns of flight 16 for receiving the resin particles. In the transition section 36, it has a root of increasing diameter, and in the metering section 38, the root returns to a constant diameter corresponding to the largest root diameter of the transition zone. In accordance with this configuration, the channel 40 formed by the helical flight 16 and root 32 coupled with the interior wall of chamber 8 decreases in volume within the transition section 36. Rotation of the screw in the direction causing the resin particles to advance from the feed section 34 through the transition section 36 causes the resin particles to become compacted to provide heating of the particles from several sources, the heat from barrel 6 and the heat generated within the chamber by compaction of particles within channel 40 and movement within these compacted particles caused by the relative movement of the particles as they are wiped along the wall of the heated barrel 6 by the helical bearing flight 16. Substantial melting of the resin particles is desired by the time the resins reach the metering section 38, where the resins may be exposed to additional heating from the barrel and motion of the resins within the shallow channel 40 present in this section.

The shearing section 18 is designed to intensify the shear of the polymer during the next portion of its advancement along the chamber. In FIG. 3, the shearing section 18 consists of three shearing sections 20 spaced apart from one another along the length of the screw to form transverse mixing channels 22 between adjacent sections 20.

As best shown in FIG. 4, each shearing section 20 comprises a plurality of bearing flights 42 and a plurality of barrier flights 44 interleaved with one another, each extending from the screw 12 and in the embodiment shown, each forming a helix angle with respect to the axis of the screw at 60°. The length of each shearing section is about the same as the diameter of the flight 42, which is the same as the diameter of the helical flight 16.

The spacing between the bearing flights and barrier flights form a corresponding plurality of interleaved entrance channels 46 and exit channels 48 extending along the axis of the screw and having the same helix angle as the bearing and barrier flights.

Means are provided for closing the entrance or upstream end 50 of each exit channel, and means are provided for closing the exit end or downstream end 52 of each entrance channel. In this embodiment, the closure means consists of a web extending from the corresponding ends of the bearing flights and having the same diameter so that the resins being plasticated do not pass over the closed ends 50 and 52 of channels 46 and 48. Instead, the resins are forced by the metering section 38 of the screw 12 into the entrance or upstream ends 54 of the entrance channels 46. In this way, the metered resins are divided into a plurality of streams of resin corresponding to the number of entrance channels present.

Spurred by the metering section 38, the resins are forced along the length of the entrance channels 46, filling their volume with resin until the resin reaches the closed downstream ends 52 of these channels.

The bearing flights 42 form the fore or leading side of the entrance channels 46, and the barrier flights 44 form the aft or trailing side of the entrance channels, with reference to the direction of rotation of screw 12. As shown best in FIG. 5, the barrier flights 44 are spaced further from the interior wall of barrel 6 as compared to the bearing flights, to form a small clearance 56 between the barrier flights and the interior wall of the barrel.

The entrance channels 46 in effect overflow with resin over the barrier flights 44 through the clearances 5 (spill clearance) to enter the trailing exit channels. In the course of passing through these clearances 56, any particles of resin present are subjected to shear and heating to cause the particles to melt and break down into small particles. The width of the clearance 56 (spill clearance) between the barrier flight and wall of the barrel 6 is established such that sufficient shear is present to cause the desired phase morphology, namely, the thermoplastic resin, component (a), being at least one continuous phase of the composition.

FIG. 6 shows one embodiment for shaping each barrier flight 44 so as to promote attenuation and thus break down of polymer particles. In this embodiment, the entry side of the clearance 56 from the entrance channel 46 is tapered away from the wall of the barrel 6 to form a wedge shaped opening 58 to the clearance 56. As the resin melt moves into the clearance 56, it becomes subjected to greater and greater shear arising from compression between the decreasing space within the wedge-shaped opening 58 and the wall of the barrel.

The resins entering the exit channels 48 via their respective barrier flights 44 and clearances 56 eventually fill up the exit channels to eventually leave these channels at the open downstream end 60 of each such channel.

Upon leaving the exit channels of shearing section 20, the resins enter the adjacent transverse mixing channel 22, where the streams of resin from the preceding exit channels 48 become united by the rotation of screw 12.

Further advancement of the resin causes it to be redivided into different streams of resin, as compared to the streams leaving the preceding exit channels 48, for entering the entrance channels 46 of the succeeding shearing section 20, to be subjected to additional shearing in the same way as described for the preceding shearing section 20. The mixing occurring in the transverse mixing channels and in the entrance and exit channels must be sufficient to cause the grafting reaction to occur and establishes the thermoplastic resin, component (a), as at least one continuous phase, which is defined herein as desired phase morphology.

This is repeated for each transverse mixing channel 22 and succeeding shearing section 20 to provide the minor component (a), as at least one continuous phase until the thoroughly plasticated resin reaches the nose 26 of the screw 12 and forward end of chamber 8, ready for melt fabrication. The number of shearing sections 20 is preferably at least 2 and more preferably at least 4, the number of such sections depending on the amount of shear that can be built into each shear section and the phase morphology to be accomplished within the cylindrical chamber housing the screw. The number of bearing and barrier flights per shearing section 20 will generally be from four to eight of each.

Some shear is accomplished in the feed, transition and metering sections of the screw, but this shear is minor and insufficient for the thermoplastic resin to be forced into at least one continuous phase to promote phase morphology as compared to the shear provided by the shear section 18. The shearing section 18 accomplishes both shear and mixing of the blend components to achieve reaction between components and the creation of the required phase morphology.

Preferably, the shearing section 18, under the conditions of plastication, achieves a shear rate of at least about 300 sec$^{-1}$ within the molten resin, more preferably at least about 600 sec$^{-1}$, and even more preferably at least about 900 sec$^{-1}$ for mixing and proper morphology, but not more than 2000 sec$^{-1}$. It should be noted that too high of a shear rate can create abundance of energy thus causing component (a), the thermoplastic resin, to degrade or components (b) and (c) to gel to form an intractable network.

Shear rate is the circumferential speed of the screw divided by the spill clearance (clearance 56). The circumferential speed of the screw is the screw diameter $\times 3.14159 \times$ rpm. The spill clearance is the difference between the radius of the barrel or cylindrical chamber and the barrier flight radius. By way of sample calculation, for a barrel having an inner diameter of 44.5 mm, the circumference of the screw will be 139.7 mm. When the screw rotates at 100 rpm, the circumferential speed is 13970 mm/min or 232.8 mm/sec. For a spill clearance of 0.1524 mm, the shear rate is 232.8 mm/sec/0.1524 mm = 1528 sec$^{-1}$.

One limitation on the amount of shear applied to the molten resin being plasticated by the shearing section 18 is that overheating of the resins can cause resin discoloration which is indicative of degradation and a deterioration of properties. The present invention achieves the desired result by judicious choice of shear time and shear intensity conditions for the particular combination of the three polymeric components, namely, components (a), (b) and (c). Shear intensity will depend on the melt viscosity of the resins being sheared, the screw rotation speed, the clearance 56 and the number of such clearances. Typically, the clearance 56 will be selected from the range of about 0.15 to 0.7 mm to obtain the result desired. Usually, the lower spill clearance will be no greater than about 0.35 mm.

The screw rotation time as defined as the time the screw is retracting during the hold time of the injection molding cycle is at least 10 seconds, more preferably 15–20 second and most preferably about 20 seconds.

The foregoing detailed discussion is applicable to carrying out the process of the present invention in both injection and injection blow molding of articles. This discussion is applicable to injection molding in a two-stage machine whether or not the screw reciprocates. If the screw reciprocates, the opportunity is offered for increasing shear time by increasing back pressure on the screw to retard its retraction. If the screw does not reciprocate, the necessary shear is accomplished during the screw rotation time in the molding cycle. In both types of two-stage machines, the forcing of the molten resin through the check valve between the screw barrel and the injection chambers subjects the molten resin to high shear to augment the shear achieved by the mixing head of the screw. The process of the present invention can also be carried out in extrusion blow molding wherein that the screw does not reciprocate. Instead it is the periodic rotation of the screw that forces an amount of molten resin into the shape desired. In extrusion blow molding, a blow-mold is then closed about the extruded shape (parison), and the mold is next transferred to a blowing station. During this mold closing and mold transfer, the screw does not rotate. In this embodiment, the desired phase morphology is achieved by shear rate and screw rotation time but without the possibility of extending the screw rotation by retarding the retraction of the screw.

The screw design of FIG. 3 insofar as the design of the shearing section 18 is concerned is a preferred design for shearing the melt of the combination of components (a), (b) and (c) of the present invention. In view of the results obtained with this design, other designs for accomplishing this result will be suggested to those skilled in the art.

Figure 7:
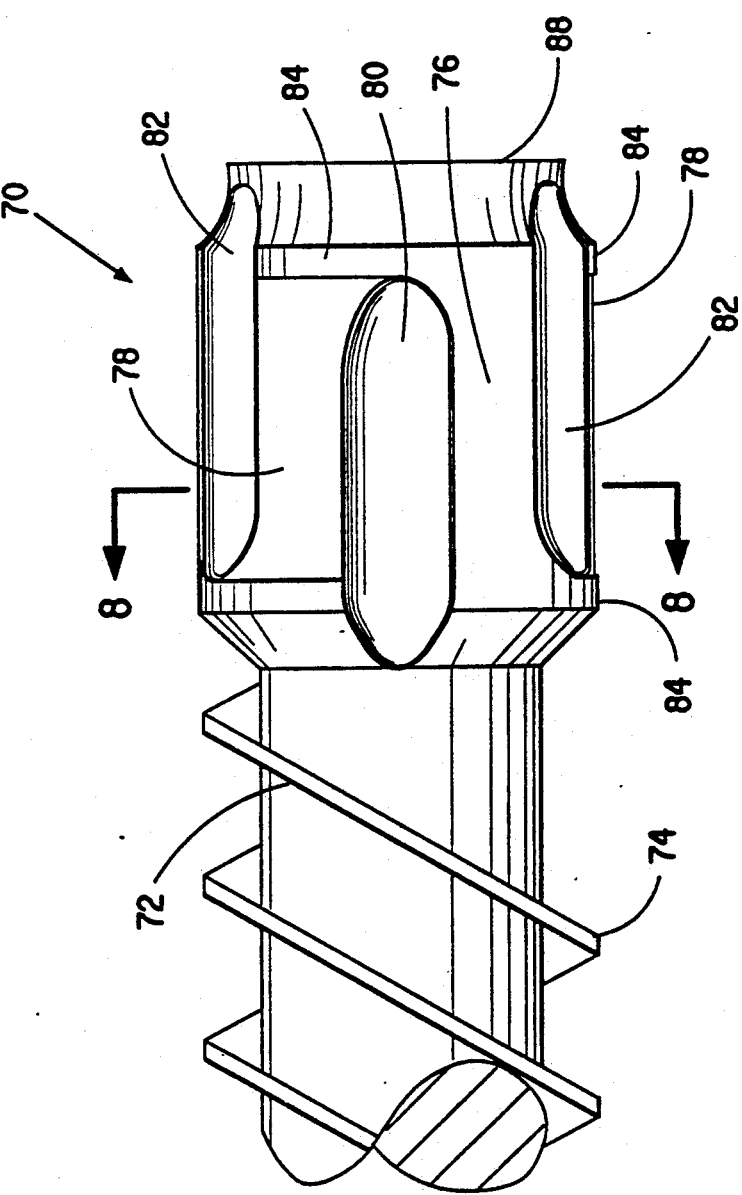
FIG. 7 shows in side elevation another embodiment of shearing section for a screw which can be used in an injection molding machine for carrying out the process of the present invention.
Figure 8:
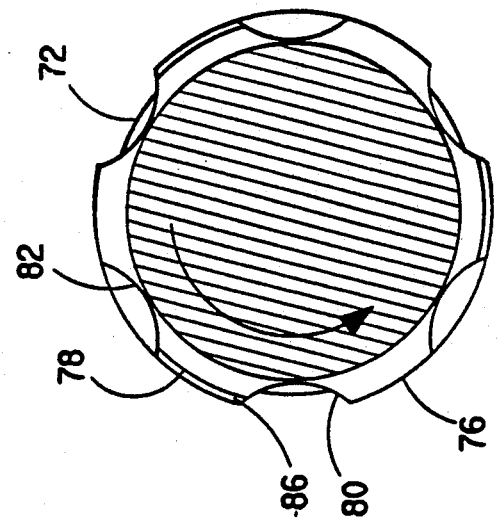
Figure 7:
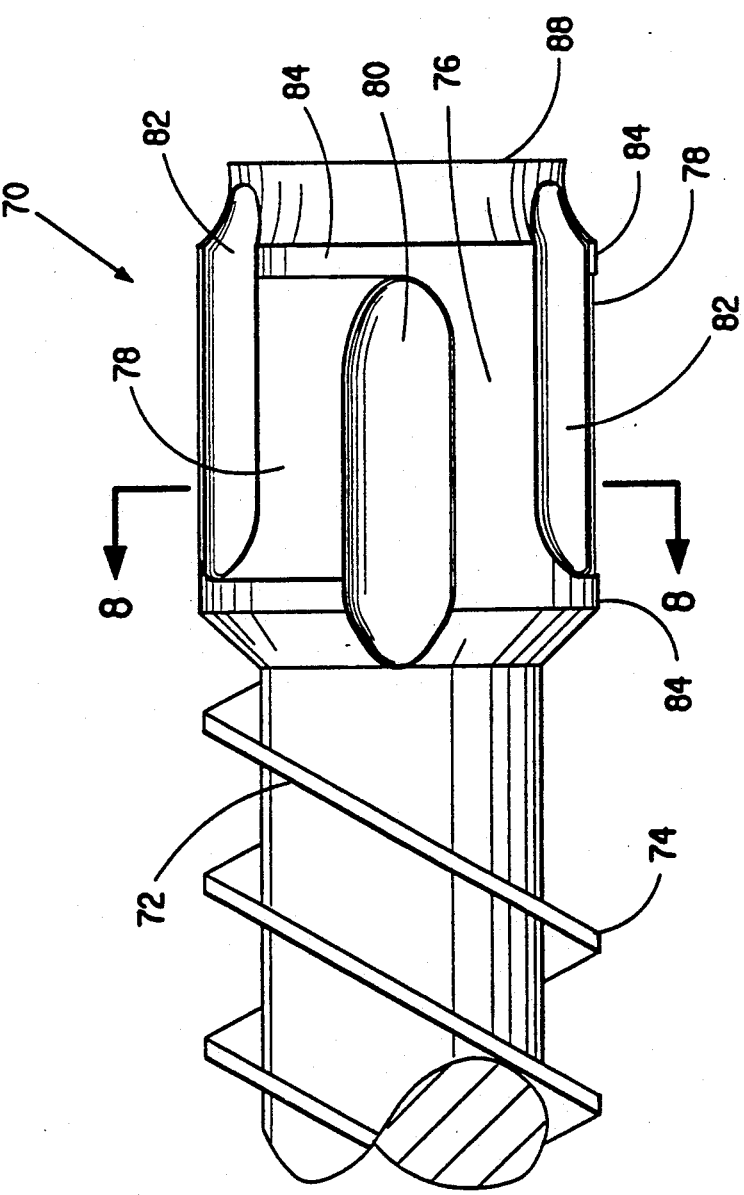

FIGS. 7 and 8 show another design of a shearing head that can be used in the present invention. This head 70 forms the forward end of a screw 72 having a helical bearing flight 74 only partially shown, which can be the same as screw 12, with head 70 forming the shearing section to take the place of shearing section 18. Head 70 is commonly available as a Maddock head for use in mixing colorant into thermoplastic resin. It has a plurality of bearing flights 76 and barrier flights 78 interleaved with one another and separated by entrance channels 80 and exit channels 82. These function similar to the corresponding elements of shearing section 18, except that in shearing head 70, they are parallel to the axis of the screw 72 and therefore do not participate in the pumping action of the screw and each shear section 20 of shearing section 18 has a greater number of flights and channels. In the embodiment shown in FIGS. 7 and 8, the spill clearance 86 is defined by the smaller radius of the barrier flights 78 as compared to the bearing flights 76 and the distance between the barrier flights and the interior wall of the barrel. Webs 84 extend from the bearing flights to close the exit end of the entrance channels and the entrance end of the exit channels and to define the sides of the spill clearance. The nose 88 of the dispersion head 70 can be equipped with a conventional check valve (not shown) so that the screw using this head can be used in injection molding involving reciprocation of the screw.

The process of the present invention is useful to directly fabricate a wide variety of articles which require extended high temperature exposure, chemical resistance, low temperature impact strength and flexibility, such as automotive engine gasket, seals, filters, and many different utilities.

EXAMPLES

A number of physical properties were measured for each composition. Unless otherwise noted, the samples were prepared and tested as follows. Melt Indices of the ethylene copolymers and the grafting agents were determined according to ASTM D-1238. Tensile properties (tensile strength and elongation) at room temperature and 150° C. were measured by ASTM Procedure D-1708. Percent retention of tensile strength and elongation at break were calculated from the individual reading taken at room temperature after aging in an air circulated oven at 150° C. for 14 days as compared with the initial room temperature readings before aging. All of the fabricated test bars of the Examples were dry-as-molded. In addition, all of the test specimens were died out at a 45° angle from the machine direction. Examples were also tested for volume swell in ASTM #3 oil for 70 hrs and 100° C. according to ASTM D-471. All Examples for volume swell in ASTM #3 oil were 1/16" (1.59 mm) thick. Another test performed was Notched Izod (ASTM D-256) on ⅛" (3.18 mm) flex bars at −29° C.

In the following Examples, all percentages of component (a), component (b) and component (c) are given by volume. All additives are given in parts per hundred resin (pph) of component (a) plus component (b) plus component (c), all values originally obtained in British units have been converted to S.I. units and rounded, where appropriate; and finally, blanks in the Tables denote either the absence of a particular component or that a particular test was not run.

The Examples found in Table 1, below, have the following molding conditions for Example 1 through 4, in a single-stage injection molding machine. For Comparative Example 5, the molding conditions used were according to Saltman II for nylon 66 as thermoplastic component (a).

TABLE 1

| Example | Rear Temp (°C.) | Center Temp (°C.) | Front Temp (°C.) |
|---|---|---|---|
| 1 | 248 | 260 | 260 |
| 2 | 249 | 261 | 262 |
| 3 | 248 | 260 | 262 |
| 4 | 244 | 261 | 261 |

| Example | Nozzle Temp (°C.) | B.I.H. | Boost Injection Pressure (MPa) | Mold Temp (°C.) |
|---|---|---|---|---|
| 1 | 260 | 5/25/25 | 3.9 | 60 |
| 2 | 262 | 5/25/25 | 3.9 | 60 |
| 3 | 262 | 5/25/25 | 4.8 | 60 |
| 4 | 262 | 5/25/25 | 5.6 | 60 |

The "B.I.H." in Table I, above, is the boost (mold open time), injection, hold cycle and is the amount of time to perform these operations in the mold cycle. The boost injection pressure in Table I is the amount of pressure used to inject the polymer into the mold.

The thermoplastic resin, component (a) used in Examples 1 through 5 in Table II, below, was Nylon 66 with a relative viscosity of 50 and a density of 1.14 g/cc. The relative viscosity was measured in formic acid with 22 g polymer/100 ml of 90% formic acid and the viscosity was measured in a Brookfield viscometer. The nylon 66 was present in an amount of 36.5 volume percent.

The acid-containing ethylene copolymer, component (b), used in Examples 1 through 5 in Table II, below, was 66.9 weight percent of ethylene/24.5 weight percent of n-butyl acrylate/8.6 weight percent of methacrylic acid, 70% neutralized with zinc ion, having a melt index of 0.5 and a density of 0.94 g/cc. This ethylene copolymer was present in an amount of 52.3 volume percent.

The polymeric grafting agent, component (c), used in Examples 1 through 5 in Table II, below, was 68.6 weight percent of ethylene/26 weight percent n-butyl acrylate/1.4 weight percent glycidyl methacrylate having a melt index of 12 g/10 min. and a density of 0.94 g/cc. The polymeric grafting agent was present in the composition in an amount of 11.2 volume percent.

Two additives were used in Examples 1 through 5 in Table II, below. Specifically zinc stearate and N,N,-hexamethylene-bis-(3,5-di-tert-butyl--4-hydroxy-hydrocinniamide) in amounts of about 2 and 1.5 pph, respectively.

In Examples 1 through 3, the rigorous mixing required to create the appropriate morphology of the composition, namely having the thermoplastic resin (component a), in at least one continuous phase, takes place during the fill time in the screw. The fill time is the screw rotation time and is the time it takes for the screw to fill up with the composition which corresponds to the screw retraction time. The screw rotation time is affected by the back pressure resisting the retraction of the screw, the screw speed and the viscosity of the resin. Examples 1 through 4, were blended and molded on a six ounce single-stage injection molding machine manufactured by HPM Corp., Mt. Gilead, Ohio, containing a 4.44 cm diameter screw. The screw was the screw described in FIG. 3 except four shearing sections, instead of three, were used, in which the clearance was 0.15 mm (0.006 in) and each shearing section had 6 barrier flights. Example 5 was also molded on a six ounce single-stage injection molding machine manufactured by HPM Corp., containing a 4.44 cm diameter screw. However, the screw used to mold Comparative Example 5 does not contain any shearing section and the resin was pre-compounded on a 28 mm twin screw extruder with high shear.

It is noted that the screw rotation time measurements in Table II for Examples 1 through 4 were not originally recorded when the data was performed, but are based on injection molding results of analogous examples (not run at the same time as the Examples in the present invention were performed); however, the same compositional components, back pressure, temperature, and screw rotation speed were used in the analogous examples.

In Table II, compare Example 2 to Comparative Example 4 where the effect of the required mixing time and shear to generate enough grafting reaction to drive the thermoplastic resin, component (a), into at least one continuous phase can be seen. Specifically, the ASTM #3 oil swell (70 hrs, 100° C.) and tensile strength at 150° C. can be used to determine if the proper morphology of the composition has been developed. These tests are very sensitive to morphology. If the ethylene copolymers components (b) and (c) are in the continuous phase, the blend will have very little tensile strength at 150° C. and will swell in oil substantially more than a blend with the thermoplastic resin as at least one continuous phase. Example 2 has a tensile strength at 150° C. of 10.4 MPa and a #3 oil swell of 12.8% compared to Comparative Example 4 which has a tensile strength at 150° C. of 1.23 MPa and a #3 oil swell of 259.4%. Comparative Example 4 is typical of what is expected from the composition of the present invention that is not mixed with sufficient shear to enable the thermoplastic resin to become at least one continuous phase. The compositions produced under the condition of Comparative Example 4 are of no utility to articles requiring high temperature exposure and chemical resistance as defined in the present invention.

In addition, it can be seen by comparing Example 2 to Comparative Example 4 that the higher the back pressure (the longer the screw retraction time or total mixing time which is a result of a longer screw rotation time) the more mixing of the resin. Thus better properties are achieved because the reaction of the three polymeric components is allowed to proceed so that the thermoplastic resin, which is less than 50 volume percent, is forced into at least one continuous phase. In particular, Example 2 has a back pressure of 1.724 MPa with a 20 second screw rotation time and Comparative Example 4 has a break pressure of 0.345 MPa with a 6 second screw rotation time.

The screw speed also affects the morphology of the composition. If the screw speed and/or the screw rotation time is too high, the thermoplastic resin will start to degrade.

Thus, in Examples 1 through 3 the mixing is controlled by the screw rotation time and back pressure, the screw speed at a given temperature, and the minimal mixing or screw rpm required to get the thermoplastic resin into the continuous phase.

Mixing of the blend in excess can lead to degradation of the thermoplastic resin and deterioration of the properties. In addition, one step fabrication has only one heat history rather than two for conventional compounding and molding procedures, thus there is less heat history in the final product. For example, the composition in Comparative Example 5 was fabricated with a two-step process as described in Saltman II for nylon 66 as component (a). The tensile strength at 150° C., the ASTM #3 oil swell, and the retention of tensile strength after aging 14 days at 150° C. are approximately 20% lower for Comparative Example 5 than Example 2, which was produced in a one-step process. The deterioration of these properties can be described as a reduction of molecular weight of the thermoplastic component (a) which is in the continuous phase, which can result from the excess thermal exposure of a two-step process. The products of the present invention will be whiter and thus have a lower yellowness index than commercially available partially grafted flexible thermoplastic resin compositions which are pre-compounded prior to fabrication.

As many widely different embodiments of this invention may me made without departing from the spirit and scope thereof, it is to be understood that this invention is not limited to the specific embodiments thereof except as defined in the appended claims.

TABLE II

ONE STEP FABRICATION OF FLEXIBLE THERMOPLASTIC COMPOSITIONS COMPARED TO A TWO STEP PROCESS

| Example | Screw Rotation Time (sec) | Back Pressure (MPa) | Screw Speed (rpm) | Tensile Strength @ Brk 23° C. (MPa) | Tensile Strength @ Brk 150° C. (MPa) | % Elong @ Brk 23° C. |
|---|---|---|---|---|---|---|
| 1 | 11 | 0.345 | 60 | 34.8 | 10.5 | 250 |
| 2 | 20 | 1.724 | 60 | 36.5 | 10.0 | 270 |
| 3 | 12 | 1.724 | 100 | 30.0 | 7.0 | 241 |
| *4 | 6 | 0.345 | 100 | 21.4 | 1.2 | 168 |
| **5 | — | — | — | 30.9 | 8.2 | 270 |

| Example | % Elong @ Brk 150° C. | ASTM #3 Oil Swell (70 hrs/100° C.) | Notched Izod −29° C. | % Ret. of Ten Strength Aged 14 days @ 150° C. | % Ret. of Elongation Aged 14 days @ 150° C. |
|---|---|---|---|---|---|
| 1 | 122 | 10.4 | Comp. break | 95 | 54 |
| 2 | 175 | 12.8 | No break | 98 | 76 |
| 3 | 60 | 32.6 | No break | 93 | 54 |
| *4 | 53 | 259.4 | No break | 63 | 26 |
| **5 | 160 | 16.8 | No break | — | 59 |

*Comparative Example
**Two-Step Comparative Example

What is claimed is

1. In a process for fabricating shaped articles of a composition of (a) 25–50 volume percent thermoplastic resin, (b) 10–74 volume percent acid containing ethylene copolymer and (c) 1-50 volume percent polymeric grafting agent, containing 0.5-15.0 weight percent of monomers containing reactive groups based on component (c) only, wherein the quantity of reactive groups provided to the molten composition by the polymeric grafting agent expressed as millimoles of reactive groups per 100 grams of component (b) plus component (c) is between 1 and 35 when component (a) is non-reactive, and from 1 to 10 when component (a) is reactive, and further wherein the above volume percentages for the components (a), (b) and (c) are based on the total of component (a), component (b) and component (c) only and are calculated from the densities of the individual components prior to mixing, the process including bringing molten components (a), (b) and (c) together under sufficient shear to cause at least the components (b) and (c) to react with each other to in turn cause the component (a) to form a continuous phase, the improvement comprising the steps of (1) bringing the molten components together for the first time in the screw of an injection mold or blow mold;

(2) subjecting the molten components to the sufficient shear on an intermittent basis; and (3) intermittently fabricating in one-step the sheared molten composition to articles of pre-determined shape.

2. The process of claim 1 wherein the intermittent shearing and intermittent one-step fabricating steps alternate with each other, and wherein the fabricating step is selected from the group consisting of single-stage injection molding and injection blow molding.

3. The process of claim 1 wherein the intermittent shearing and intermittent one-step fabricating steps are simultaneous with each other, and wherein the fabricating step is selected from the group consisting of extrusion blow molding and two-stage injection molding.

4. The process of claim 1 wherein the shear in step (1) is at a shear rate of least 300 sec$^{-1}$.

5. The process of claim 4 wherein the shear is at the rate of at least 600 sec$^{-1}$.

6. The process of claim 5 wherein the shear is at the rate of at least 900 sec$^{-1}$.

7. The process of claim 1 wherein the component (a) is selected from the group consisting of polyamides, co-polyamides, polyesters, co-polyesters, polycarbonates, polyethylenes, and polyproplenes.

8. The process of claim 1 wherein component (a) is present in an amount of 27-48 volume percent, component (b) is present in an amount of 20-69 volume percent, and component (c) is present in an amount of 4-35 volume percent.

9. The process of claim 7 wherein component (a) is present in an amount of 28-46 volume percent, component (b) is present in an amount of 30-65 volume percent, and component (c) is present in an amount of 7-25 volume percent.

10. The process of claim 1 wherein the shear in step (1) is achieved by rotation of a screw including at least 1 shear element for at least 10 seconds during each molding cycle.

11. The process of claim 10 wherein the shear in step (1) is achieved by rotation of a screw, including at least 1 shear element for at least 15 to 20 seconds during each molding cycle.

12. The process of claim 11 wherein the shear in step (1) is achieved by rotation of a screw, including at least 1 shear element for about 20 seconds during each molding cycle.

13. The process of claim 1 wherein the component (a) is selected from the group consisting of co-polyamides and co-polyesters.

* * * * *